(12) United States Patent
Jupudi et al.

(10) Patent No.: US 7,901,549 B2
(45) Date of Patent: Mar. 8, 2011

(54) GAS EVOLVING ELECTROLYSIS SYSTEM

(75) Inventors: Ravichandra Srinivasa Jupudi, Bangalore (IN); Richard Scott Bourgeois, Albany, NY (US); Hongmei Zhang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1096 days.

(21) Appl. No.: 11/567,279

(22) Filed: Dec. 6, 2006

(65) Prior Publication Data

US 2008/0135402 A1 Jun. 12, 2008

(51) Int. Cl.
*C25B 9/08* (2006.01)

(52) U.S. Cl. .......... 204/255; 204/254; 204/252; 204/263

(58) Field of Classification Search .......... 204/254–258, 204/267–270, 263, 252
See application file for complete search history.

(56) References Cited

U.S. PATENT DOCUMENTS

| | | | |
|---|---|---|---|
| 4,137,144 A * | 1/1979 | Kenney | 204/268 |
| 4,472,255 A * | 9/1984 | Millington et al. | 204/255 |
| 4,851,377 A | 7/1989 | Breault | |
| 4,963,241 A * | 10/1990 | Brattan | 204/237 |
| 5,013,418 A | 5/1991 | Wullenweber et al. | |
| 5,702,839 A | 12/1997 | Frost et al. | |
| 5,871,860 A | 2/1999 | Frost et al. | |
| 6,924,057 B2 | 8/2005 | Wilkinson et al. | |
| 2007/0251830 A1 * | 11/2007 | Conrad | 205/508 |

FOREIGN PATENT DOCUMENTS

IN 694MUM2005 10/2005

OTHER PUBLICATIONS

Anders A. Dahlkild, "Modelling the two-phase flow and current distribution along a vertical gas-evolving electrode," J. Fluid Mech. (2001),Cambridge University Press, vol. 428, pp. 249-272.
A. M. Couper et al., "Electrode Materials for Electrosynthesis," Chemical Reviews, 1990, vol. 90, No. 5, American Chemical Society, pp. 837-865.

* cited by examiner

*Primary Examiner* — Bruce F Bell
(74) *Attorney, Agent, or Firm* — Francis T. Coppa

(57) ABSTRACT

A gas evolving bipolar electrolysis system is provided which includes multiple cells. Each cell further includes a cathode, an anode, at least one inlet and at least one outlet for flow of electrolyte and the cathode and the anode are configured to maintain a variable interelectrode gap between the cathode and the anode. In some embodiments, the cell includes a membrane disposed between the electrodes and in some other embodiments the electrodes are coated with electrocatalysts configured to provide uniform current density on the electrode surface.

19 Claims, 7 Drawing Sheets

GAS EVOLVING ELECTROLYSIS SYSTEM

BACKGROUND

This invention generally relates to a gas evolving electrolysis cell and in particular to the arrangement of electrodes in an alkaline electrolysis cell for generation of hydrogen.

Many important industrial processes involve electrolysis operation with generation of gases from an electrolyte solution. For example, electrolysis of potassium hydroxide solution for production of hydrogen and oxygen gases is an electrolytic process involving generation of gases at electrodes. Most industrial electrolyzers have a bipolar configuration, with bipolar plates stacked in electrical series. Voltage is applied at the end plates and each intermediate plate acts as a positive electrode (anode), on one side, and a negative electrode (cathode), on another. A bipolar electrolyzer typically comprises multiple cells with parallel paths for electrolyte solution and product gases. These cells are typically fed with the electrolyte solution at the bottom of the cell. The electrolyte solution and the product gases from the electrolysis process typically exit at the top of the cell.

During electrolysis, ions are transported between the electrodes. In water electrolysis, hydrogen ions at the cathode form hydrogen bubbles and oxygen ions at the anode form oxygen bubbles. Typically a membrane is provided between the electrodes to avoid mixing of the product gases. The gas bubbles move with the electrolyte upwards and are removed as a two-phase mixture of the product gas and the electrolyte. Typically the volume fraction of bubbles in the electrolyte solution increases as the bubbles go up within the electrolyte solution. This results in a blanketing of the electrodes by the gas bubbles. This in turn increases the ohmic resistance of the electrolyte solution and the current density decreases along the electrode surface.

In general, the rate of degradation of an electrode is a function of local current density value. A non-uniform distribution of current density on the electrode surface results in high local current density values at some points on the electrode surface, where a premature degradation of electrode surface occurs. This necessitates a replacement of the electrode even when all parts of the electrode are not degraded. If the degradation occurs more frequently, the system needs to be shut down more often for replacement of the electrodes in turn increasing the operating costs.

Therefore there is a need to design electrolyzers with less degradation of electrodes and lower operating costs.

BRIEF DESCRIPTION OF THE INVENTION

Briefly, according to one embodiment of this invention, a gas evolving bipolar electrolysis system is provided which includes multiple cells. Each cell further includes a cathode, an anode, at least one inlet and at least one outlet for flow of electrolyte and the cathode and the anode are configured to maintain a variable interelectrode gap between the cathode and the anode. In some embodiments, the cell includes a membrane disposed between the electrodes and in some other embodiments the electrodes are coated with electrocatalysts configured to provide uniform current density on the electrode surface.

In another embodiments, a gas evolving bipolar electrolysis system with a plurality of electrolytic cells is described wherein each cell includes a cathode, an anode disposed adjacent to the cathode and defining a gap between the anode and the cathode. Each cell has at least one inlet for electrolyte flow and at least one outlet for electrolyte flow and the cathode and the anode are configured such that the gap between the cathode and the anode is smaller near the flow outlet compared to the gap near the flow inlet.

In another embodiments, a gas evolving bipolar electrolysis system multiple electrolytic cells is provided. Each cell includes a pair of primary electrodes, a pair of secondary electrodes, at least one inlet for flow of electrolyte into the electrolysis system and at least one outlet for flow of electrolyte from the electrolysis system. The system is configured to provide a gap between the primary electrode and the secondary electrodes are joined to the primary electrodes such that the gap between the pair of primary electrodes is narrower near the outlet for flow of electrolyte than the gap between the pair of primary electrodes near the inlet for flow of electrolyte into the system. In some embodiments, the combined electrode assembly includes a coating of electrocatalysts, configured to maintain a uniform current density along the electrode.

DESCRIPTION OF THE DRAWINGS

These and other features, aspects, and advantages of the present invention will become better understood when the following detailed description is read with reference to the accompanying drawings in which like characters represent like parts throughout the drawing, wherein.

DETAILED DESCRIPTION

Figure 1:
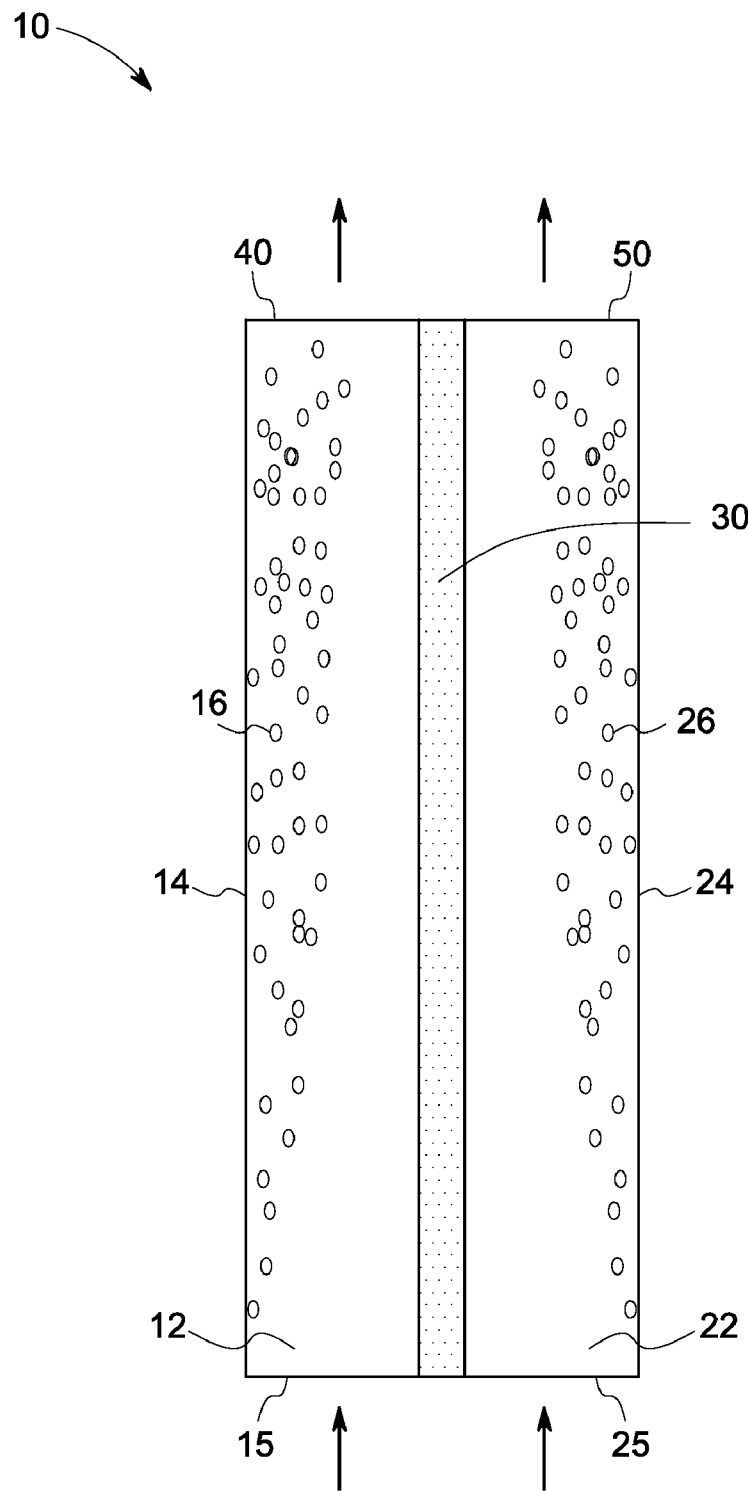
FIG. 1 is a diagrammatical representation of a typical electrolysis cell (Prior Art)

A bipolar electrolyzer typically includes multiple electrolytic cells. FIG. 1 shows a single electrolytic cell of a conventional bipolar electrolyzer 10 used for the electrolysis of an electrolyte, for example potassium hydroxide (KOH). The electrolytic cell 10 includes a cathode 14 and an anode 24.

During electrolysis, hydrogen gas is evolved at the cathode and oxygen gas is evolved at the anode. These two gases, if not prevented from mixing, may form an explosive mixture. To substantially prevent the mixing of these gases, a membrane 30 is interposed between the two electrodes. In practice, the mixing of the product gases needs to be kept below 2% to avoid any hazards and to ensure practical recovery of product gases.

The membrane 30 divides the cell 10 into two halves, a cathode chamber 12, and an anode chamber 22. The arrows indicate the direction of flow of the electrolyte into and out of the electrolytic cell 10.

In the foregoing discussion, the cathode and the anode are generally referred to as 'electrode', to describe their common aspects. Similarly, the term 'electrode chamber' is used to describe common aspects of the anode chamber and the cathode chamber.

The electrodes typically comprise flat plates. In some cases, the electrodes are made porous to provide an extended area for electrolysis reaction. The electrode surface is typically provided with a coating of an electrocatalyst to reduce the overpotential on electrodes. The overpotential of an electrode is the extra potential that needs to be supplied to the electrode above the theoretical voltage required for the evolution of a gas on the electrode surface. This extra potential is required due to various losses—losses at the electrode surface, losses due to resistance of electrolyte solution, and the like. The application of an electrocatalyst material on the electrodes allows the generation of gases at lower potentials. This reduction in voltage is dependent on many factors including but not limited to the selection of electrode-electrolyte pair, the type of electrode (anode or cathode), the gas involved at the electrode, for example. The reduction in voltage may be of the order of a few hundreds of millivolts. As per one report, the electrode overpotential for an oxygen electrode was reduced by 100-150 mV by incorporation of coatings of transition metal oxides, spinels or perovskites. Other electrocatalysts known in the art include like platinum, molybdenum, cobalt, and palladium.

Each electrode chamber is provided with a separate inlet and an outlet for flow in and out of the chamber. Accordingly, the cathode chamber 12 has an inlet for flow of electrolyte, 15, and an outlet for flow of electrolyte, 40. The anode chamber 22, has an inlet 25 for flow of electrolyte, and an outlet 50 for flow of electrolyte. During electrolysis reaction, hydrogen ions at the cathode produce hydrogen gas bubbles 16, and oxygen ions at the anode produce oxygen gas bubbles 26. Thus, the flow at the outlet 40 is a mixture of the electrolyte and hydrogen gas bubbles 16 and the flow at the outlet 50 is a mixture of the electrolyte and oxygen gas bubbles 26.

As the electrolyte moves in an electrode chamber from the inlet to the outlet, it comes in contact with an increased electrode surface area, thereby producing an increased number of gas bubbles. Thus in the cathode chamber 12, the volume of hydrogen gas bubbles and hence the bubble volume fraction progressively increases from the flow inlet 15 to the flow outlet 40. Similarly the bubble volume fraction in anode chamber 22 increases from the flow inlet 25 to flow outlet 50.

As the bubble volume fraction in an electrode chamber increases, the electrode surface gets increasingly blanketed by the bubbles, thus increasing the resistance of the electrolyte solution. Since the potential difference between the anode and the cathode is approximately constant, this increase in the resistance of solution across the electrode surface in turn reduces the current density according to Ohm's law. Thus the current density progressively decreases at the electrode surface from the electrolyte flow inlet to electrolyte flow outlet. The higher the rate of evolution of the bubbles, the higher the change in current density along the electrode surface.

A non-uniform distribution of current density on the electrode surface results in high local current density values at some points on the electrode surface, where a premature degradation of electrode surface occurs. When an electrode degrades, microstructure and the material properties change resulting in a lowering of the performance (rate of production of gases). As the extent of degradation increases, it necessitates the replacement of the electrodes. In many electrolysis stacks the individual electrodes cannot be replaced, and an expired electrode may necessitate replacement of the entire electrolysis stack. The frequent shutdown of operation for changing of the electrodes or replacement of the stack increases operating costs.

The embodiments of the present invention provide for a bipolar electrolysis system that reduces the degradation of an electrode. The electrodes are configured to have a substantially uniform current density across the electrode surface. The cell is designed to minimize the variation of current density across the electrode by reducing the bubble volume fraction in the electrode chambers. The configurations of cell designs are illustrated in the foregoing paragraphs.

Figure 2:
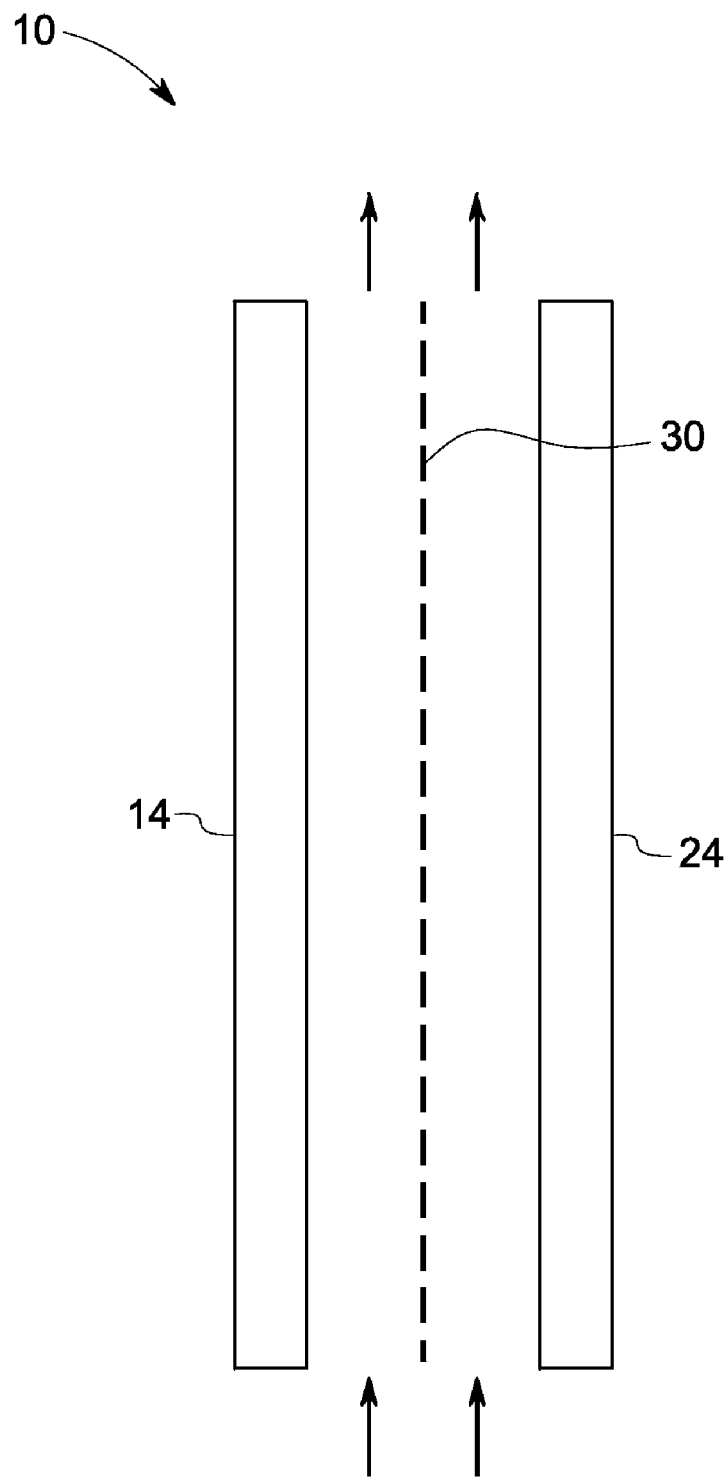
FIG. 2 is a schematic of a conventional electrolysis cell with electrodes of uniform thickness (Prior Art)
Figure 3:
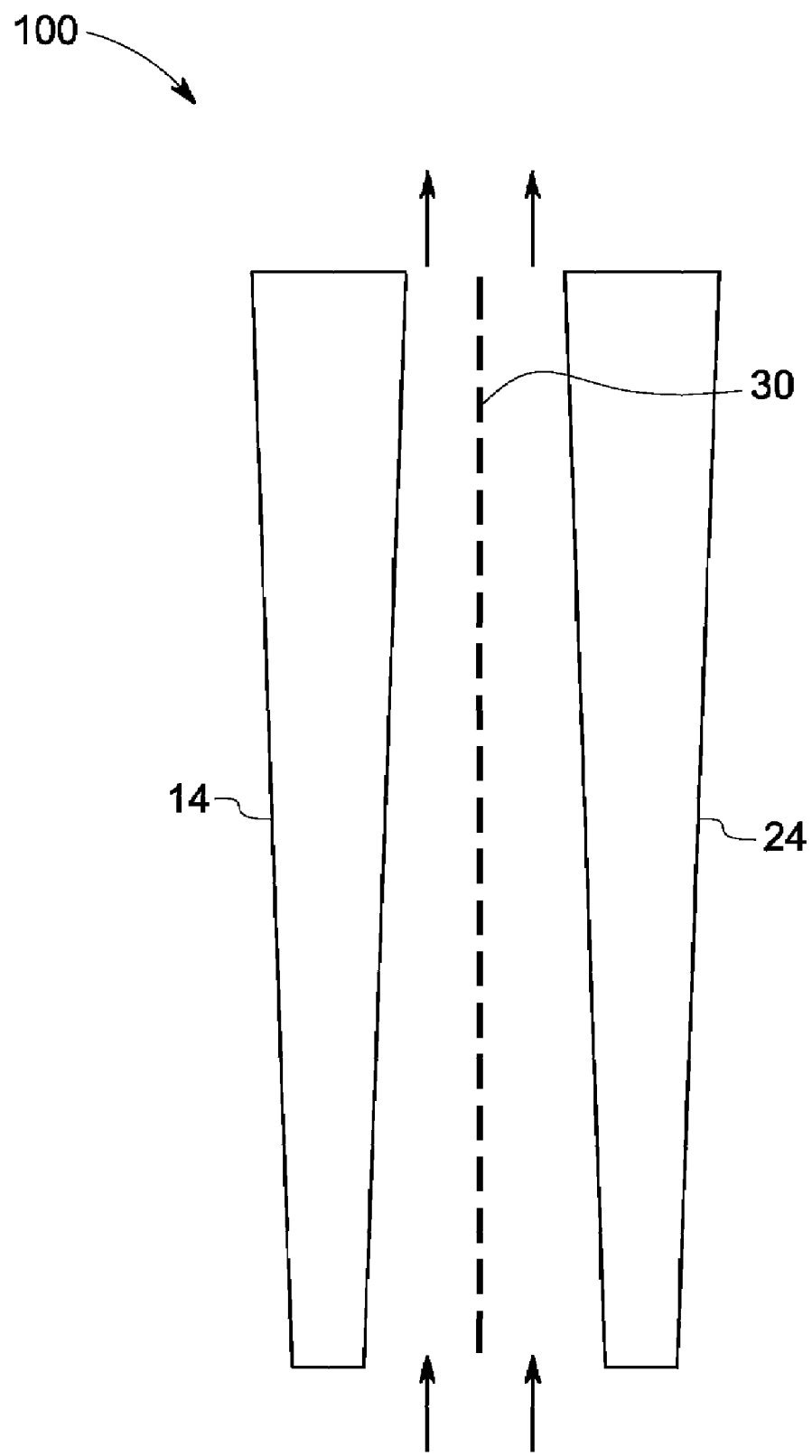
FIG. 3 is a diagrammatical representation of one embodiment of the present invention.

One embodiment of the present invention is illustrated in FIG. 3. To appreciate the embodiment better, the prior art electrolytic cell 10 of FIG. 1 is redrawn as FIG. 2. Essentially, the prior art configuration has a cathode 14, an anode 24 and a membrane 30 interposed between the electrodes. The electrodes 14 and 24 have uniform thickness and the electrodes are disposed substantially parallel to each other. The arrows indicate the direction of flow of electrolyte into and out of the electrolytic cell 10. In contrast, as per one embodiment of the present invention illustrated in FIG. 3, the electrolytic cell 100 has a cathode 14 and the anode 24 with a wedge shape. The surfaces of the electrodes taper towards the outlet for flow of the electrolyte. The arrows show direction of flow of electrolyte into and out of the electrolytic cell 100. The cross-sectional area of the electrode chamber progressively decreases from the inlet to the outlet. As the cross sectional area of the electrode chamber decreases and the rate of flow of the electrolyte is held constant, the local velocity of the fluid increases. Due to the convective effect of increased velocity of the flow of the electrolyte, the bubbles are swept by the electrolyte flow through the flow outlet. The bubble density in the electrode chamber thus decreases and the wide variations in current density are avoided. This in turn avoids the disadvantages described earlier.

In another embodiment, a pair of secondary electrodes is attached to the electrodes of the bipolar electrolyzer (now called primary electrodes) to form a combined electrode assembly. The pair of primary electrodes has a surface parallel to each other, as in conventional bipolar electrolyzers. The secondary electrodes are joined to the primary electrodes by a variety of techniques, including but not limited to welding or cladding. The joint between the primary and the secondary electrodes provides an electrical contact between the two pair of electrodes, to enable the combined electrode assembly to participate in the electrolysis reaction for evolution of gases. The secondary electrodes could be of various shapes and sizes.

Figure 4:
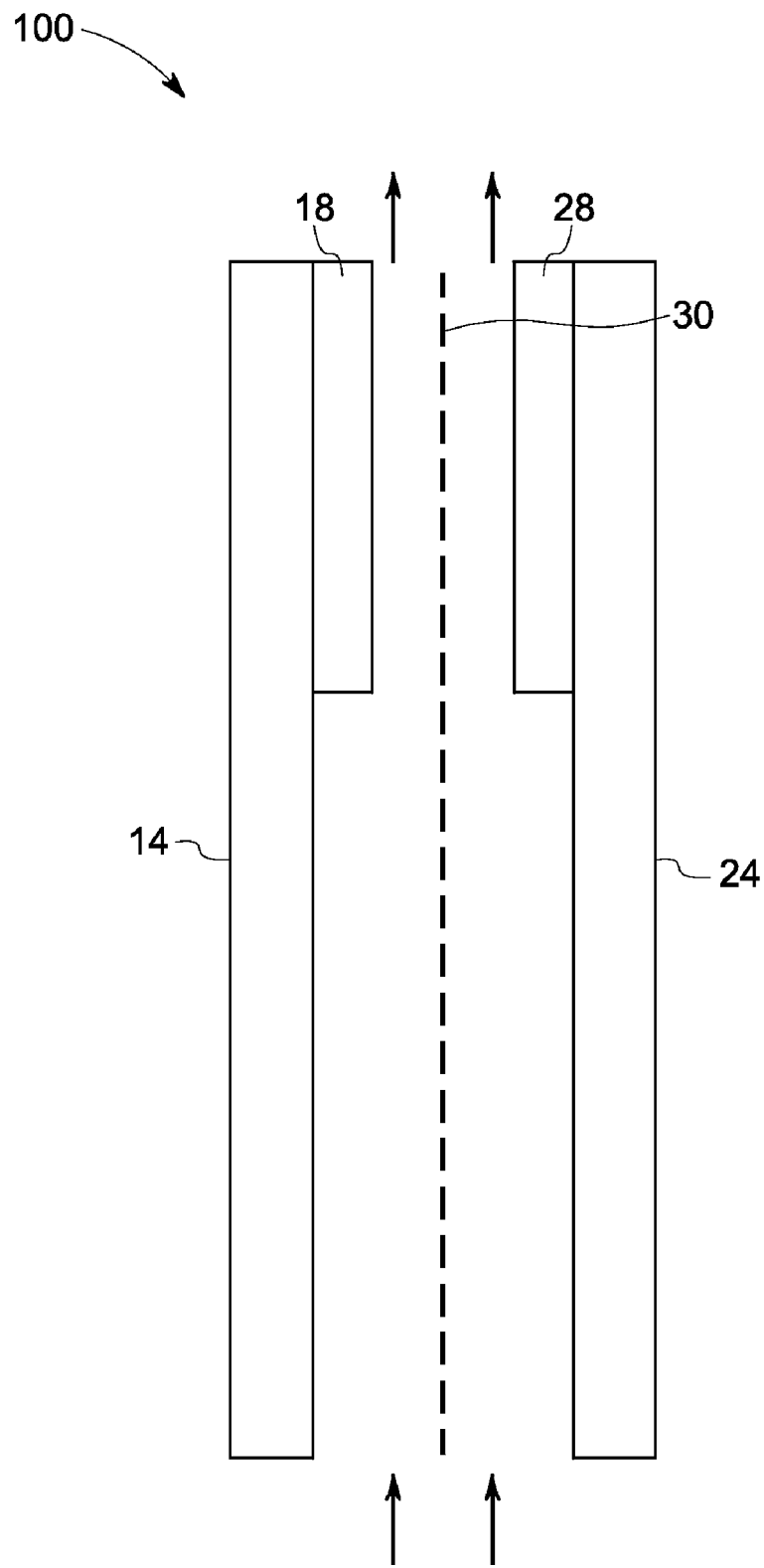
FIG. 4 is a diagrammatical representation of another embodiment of the present invention.

In an embodiment shown in FIG. 4, the cathode 14 and the anode 24 constitute primary electrodes of the electrolytic cell 100. The primary electrodes in this embodiment are simple flat plates. 18 and 28 represent the secondary electrodes used herein. In this embodiment, the secondary electrodes are also flat plate type and are welded to the primary electrodes to form a combined electrode assembly. The arrows show direction of flow of electrolyte into and out of the cell. The combined electrode assembly results in lower inter-electrode gap near the outlet for flow of electrolyte. Due to a lower cross-sectional area of electrode chambers and constant flowrate of the electrolyte, the local velocity of electrolyte increases. Due to the convective effect of increased velocity of the flow of the electrolyte, the bubbles are swept by the electrolyte flow through the flow outlet. The bubble density in the electrode chamber thus decreases and the wide variations in current density are avoided.

Figure 5:
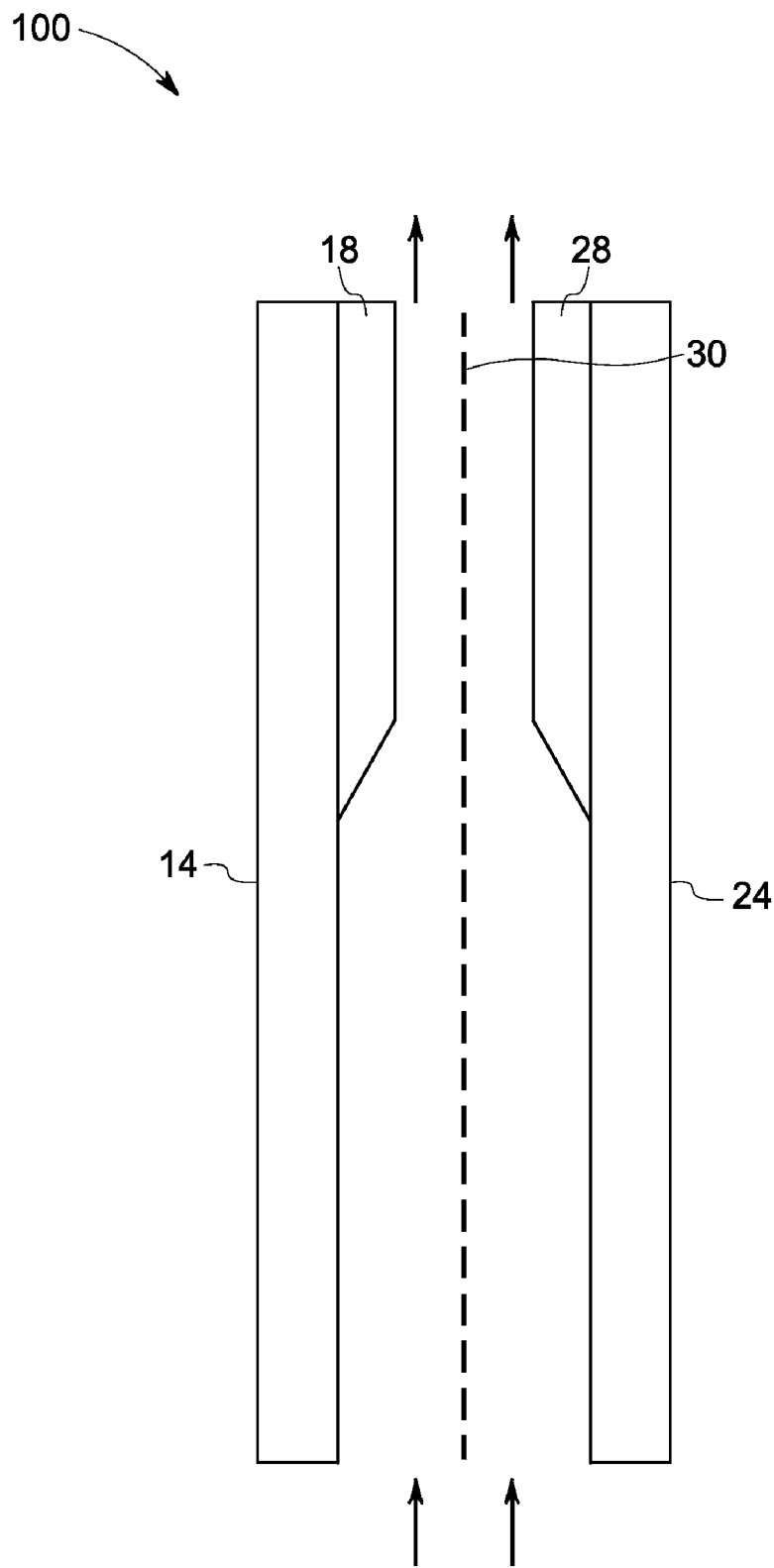
FIG. 5 is a diagrammatical representation of yet another embodiment of the present invention.

FIG. 5 shows an alternate embodiment of the invention. The arrows indicate the direction of flow of electrolyte in the electrode chambers. The cathode 14 and the anode 24 constitute primary electrodes of the electrolytic cell 100 and 18 and 28 represent the secondary electrodes. Both the primary electrodes and the secondary electrodes are simple flat plates. The ends of secondary electrodes are tapered to offer minimum resistance to flow at the junction of primary and secondary electrodes. The flow of electrolyte encounters a gradual decrease in the cross-sectional area of the electrode chamber, resulting in minimum pressure drop in the electrode chamber. The taper provided at the ends of secondary electrodes may have various cross-sections as desired. The configuration so described also results in reduced interelectrode gap between the combined electrode assemblies. Due to the increased convective effect of the electrolyte, the gas bubbles are swept by the electrolyte reducing the bubble density in the electrode chamber. This in turn results in reduction in variation of current density on the electrode assembly.

In some embodiments, the primary electrodes, or the secondary electrodes or both are configured to be porous. In some other embodiments, the primary electrodes, or the secondary electrodes or both are optionally coated with an electrocatalyst material to reduce electrode overpotential.

In another embodiment, the coating of an electrocatalyst material is configured to provide a substantially uniform current density on the electrode surface.

The current density span is defined as $$Jspan=(Jmax-Jmin)/Jmean \times 100 \quad (1)$$

where Jspan=span of current density;
Jmax=maximum current density on the electrode;
Jmin=minimum current density on the electrode; and
Jmean=area weighted average current density on the electrode.

Typically Jmax is observed at the electrode end near inlet for flow of electrolyte and Jmin is observed at the electrode end near outlet for flow of electrolyte.

In general, the rate of degradation is a function of local current density value. A non-uniform distribution of current density on the electrode surface results in a non-uniform degradation of the electrode. This necessitates a replacement of the electrode even when all parts of the electrode are not degraded. This results in a considerable loss, due to incomplete utilization of active electrode material. To limit such a loss, it is desirable to minimize the value of Jspan.

The substantially uniform current density as described herein refers to a Jspan value of 20% or less. It has been observed that when Jspan is maintained at or below 20%, the variation in the rate of degradation of the electrode across the electrode surface is not significant and problems arising due to non-uniform current density are avoided.

In one embodiment, the electrocatalyst loading on the electrode surface is configured to give substantially uniform current density on the surface of electrodes that have a surface parallel to each other—similar to conventional bipolar electrolyzer.

In another embodiment, the electrocatalyst loading is configured to provide a substantially uniform current density of surface of electrodes of system with non-uniform inter-electrode gap as shown in FIG. 3, FIG. 4 or FIG. 5.

Although the embodiments of the invention have been described with respect to a bipolar electrolyzer with vertical electrolysis cells, the features of the invention are equally applicable to electrolysis cells that have horizontal or any other orientation.

The embodiments of the present invention are described above by taking an example of electrolysis of potassium hydroxide (KOH) solution for production of hydrogen and oxygen gases. However, the features of the present invention are applicable to any gas evolving liquid electrolysis system. For example, the features of the invention may be applied to the electrolysis of other liquid solutions such as but not limited to brine (sodium chloride) solution to generate chlorine and hydrogen gases at the anode and the cathode respectively.

The features of the invention may also be applied to electrolyzers that involve production of gas only at one of the electrodes. In such cases, the membrane 30 may not be employed and typically a single inlet and outlet for the electrolyte flow is provided.

The features of the invention can also be applied to systems involving a molten electrolyte. Such systems are typically involved in metallurgical processes. For example, the Alcoa process involves electrolysis of aluminum chloride in a molten chlorides mixture using graphite electrodes in a bipolar electrolyzer. The process involves generation of chlorine gas at anodes and formation of aluminum at the cathode. The arrangement of electrodes as per the embodiments of present invention help faster removal of the generated gases, with a substantially uniform current density on the electrode surface.

EXAMPLES

The following examples are presented to further illustrate certain embodiments of the present invention. These examples should not be read to limit the invention in any way.

Figure 6:
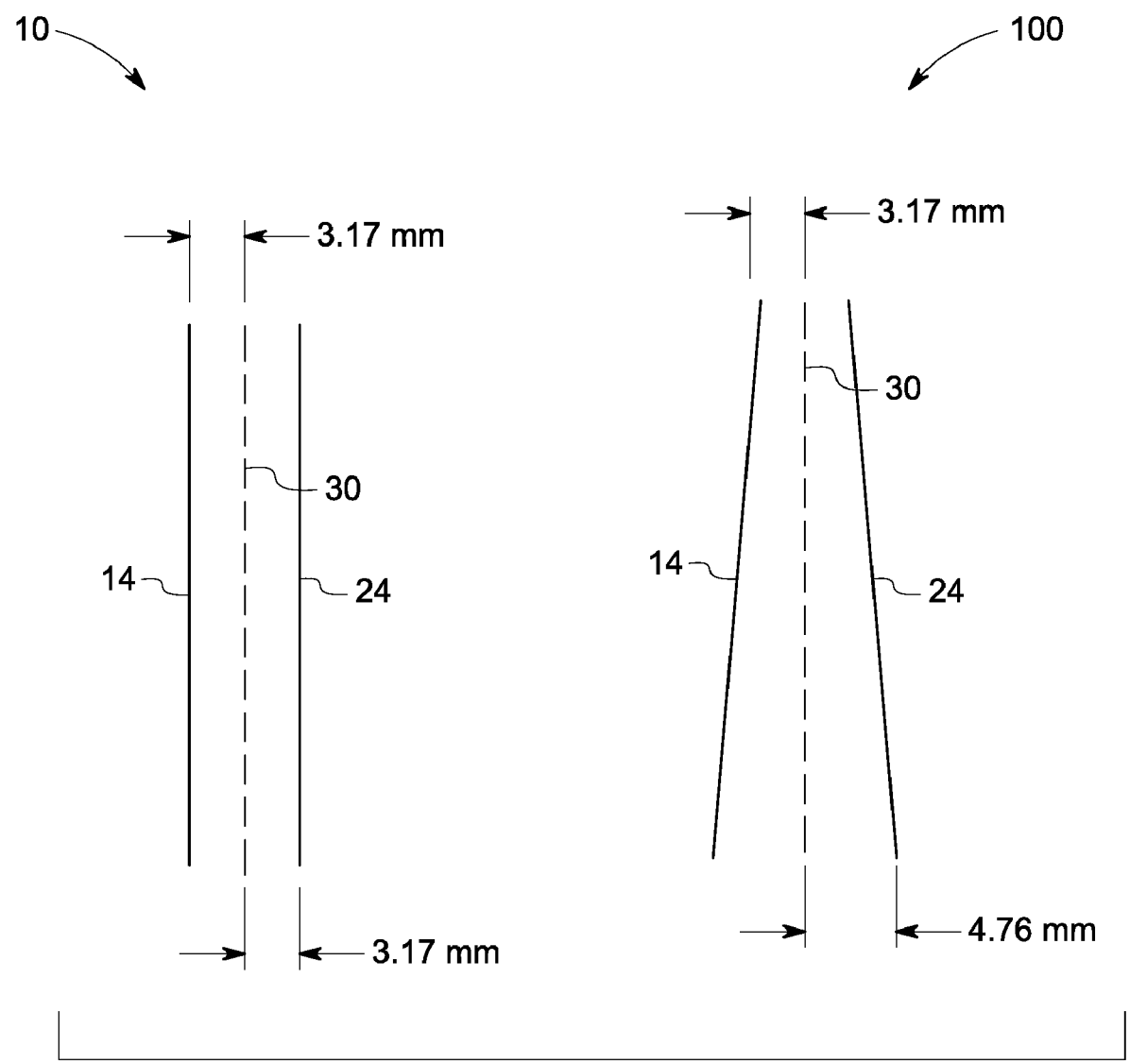
FIG. 6 is a schematic of cells on which CFD runs were performed.

Computation Fluid Dynamics (CFD) experiments are performed that illustrate some embodiments of the present invention. FIG. 6 illustrates the configuration of cells used in the experiment. The system modeled is the electrolysis of potassium hydroxide solution for generation of hydrogen at cathode and oxygen at anode. The model involves a single electrolytic cell of conventional configuration 10, and a single electrolytic cell 100 in accordance with one embodiment of the present invention. In both the cells, 14 represents the cathode, 24 represents the anode, and 30 represents the membrane used. The electrodes used here are flat plate type. The membrane 30 is placed at the center of the cell and the top ends of the both electrodes are disposed at the same distance on either side of the membrane. The lower ends of the electrodes are also disposed at an equal distance from the membrane. The electrode has a length of 60 cm and the area of surface (parallel to other electrode) is 0.369 m².

In system 10, the electrodes are disposed parallel to each other, and the uniform distance between the electrode and membrane is 3.17 mm. In system 100, the distance between the membrane and the lower end of electrodes is maintained at 4.76 mm while the distance between top end of electrode and the membrane is maintained at 3.17 mm, same as in system 10. In both systems the electrolyte flow inlet is near the lower end of the electrodes and the electrolyte flow outlet near the top end of the electrode. The flow rate of the electrolyte is maintained at 0.64 kg/s. The electrolysis cell is operated at a pressure of 1 atmosphere and a temperature of 353 K (80° C.).

Figure 7:
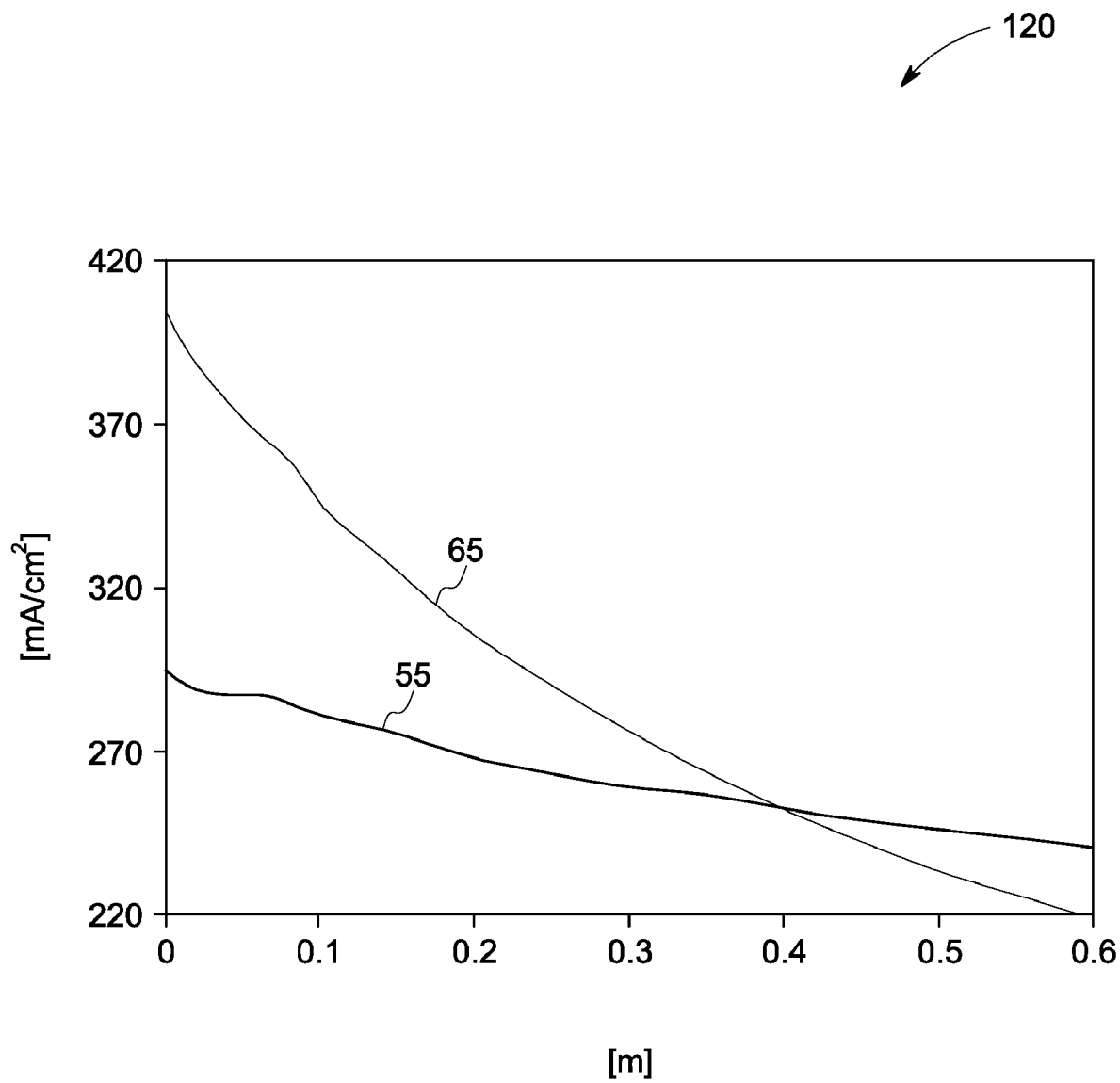
FIG. 7 shows the current density variations observed from the model.

FIG. 7 shows the current density variations observed from the model generally as 120. The x-axis represents the distance (height of electrode), measured from the inlet for flow of the electrolyte in meters. The y-axis represents the local current density values (mA/cm²) on the electrode. Line 65 represents values for system 10 and line 55 represents values for system 100. In system 10, which is a conventional electrolyzer system, there is a very wide variation of local current density from 400 mA/cm² to 220 mA/cm², corresponding to a Jspan of 65%. This is in accordance with the description of conventional electrolysis systems mentioned earlier. For system 100, the variation of current density is from 300 to 240 mA/cm² and the span of current density, Jspan is only 20%.

With measures like optimization of various parameters, incorporation of a suitable electrocatalyst materials among others, the Jspan can be reduced to values like 15%, 10% or lower.

Thus, the embodiments of the present invention provide for a variable interelectrode gap between the electrodes of a bipolar electrolytic cell. This configuration increases the rate of removal of gas bubbles from the electrode chamber thereby reducing the bubble volume fraction and in turn the variation of current density on the electrode surface. According to another embodiment of the present invention, the coating of an electrocatalyst material on the surface of the electrode is varied to achieve a substantially uniform current density on the surface of the electrode. The substantially uniform current density across the surface avoids situations leading to uneven degradation of electrode. Thus the embodiments of the present invention avoid the situation of frequent electrode replacement, leading to reduced maintenance cost and increased the reliability of the electrolyzer system.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A gas evolving bipolar electrolysis system comprising a plurality of electrolytic cells, each cell comprising:
    a cathode;
    an anode;
    a membrane interposed between said cathode and said anode, said membrane dividing the cell into a cathode chamber and an anode chamber, respectively;
    at least one inlet for flow of electrolyte into said cathode chamber and said anode chamber; and
    at least one outlet for flow of electrolyte out of said cathode chamber and said anode chamber;
    wherein a cross-sectional area of said cathode chamber and said anode chamber is larger proximate said at least one inlet compared to said at least one outlet, thereby causing an increase in a local velocity of the electrolyte within said cathode chamber and said anode chamber.

2. The gas evolving bipolar electrolysis system of claim 1, wherein at least one of said cathode and said anode is coated with an electrocatalyst to reduce electrode overpotential.

3. The gas evolving bipolar electrolysis system of claim 2, wherein the said electrocatalyst is configured to achieve a substantially uniform current density on surface of said cathode and said anode.

4. The gas evolving bipolar electrolysis system of claim 1, further comprising a secondary electrode attached to said cathode and a secondary electrode attached to said anode, wherein said secondary electrodes are disposed within said cathode chamber and said anode chamber to cause the decrease the cross-sectional area of said cathode chamber and said anode chamber.

5. The gas evolving bipolar electrolysis system of claim 1, wherein the said inlet for flow of electrolyte is configured to handle a liquid electrolyte.

6. The gas evolving bipolar electrolysis system of claim 1, wherein said at least one inlet for flow of electrolyte is configured to handle a molten electrolyte.

7. The gas evolving bipolar electrolysis system of claim 1 wherein said at least one inlet for flow of electrolyte is configured to handle an electrolyte comprising potassium hydroxide solution and said cathode is configured to evolve hydrogen gas and said anode is configured to evolve oxygen gas.

8. A gas evolving bipolar electrolysis system comprising a plurality of electrolytic cells, each cell comprising:
    a cathode;
    an anode;
    a membrane interposed between said anode and said cathode, said membrane dividing the cell into a cathode chamber and an anode chamber, respectively;
    at least one inlet for flow of electrolyte into said cathode chamber and said anode chamber; and
    at least one outlet for flow of electrolyte out of said cathode chamber and said anode chamber;
    wherein a cross-sectional area of said cathode chamber and said anode chamber is smaller proximate said at least one outlet compared to said cross-sectional area of said cathode chamber and said anode chamber proximate said at least one inlet.

9. The gas evolving bipolar electrolysis system of claim 8, wherein at least one of said anode and said cathode is coated with an electrocatalyst to reduce electrode overpotential.

10. The gas evolving bipolar electrolysis system of claim 9 wherein the said coating of an electrocatalyst is varied to achieve nearly uniform current density on electrode surface.

11. The gas evolving bipolar electrolysis system of claim 8, further comprising a secondary electrode attached to said cathode and a secondary electrode attached to said anode, wherein said secondary electrodes are disposed within said cathode chamber and said anode chamber to cause the decrease the cross-sectional area of said cathode chamber and said anode chamber.

12. The gas evolving bipolar electrolysis system of claim 8, wherein said at least one electrolyte flow inlet is configured to handle the electrolyte in liquid form.

13. The gas evolving bipolar electrolysis system of claim 8, wherein said at least one electrolyte flow inlet is configured to handle the electrolyte in molten form.

14. A gas evolving bipolar electrolysis system multiple electrolytic cells, each cell comprising:
    a pair of primary electrodes with a gap between said pair of primary electrodes;
    a pair of secondary electrodes;
    at least one inlet for flow of electrolyte into said electrolysis system; and
    at least one outlet for flow of electrolyte from said electrolysis system;
    wherein said pair of secondary electrodes are attached to said pair of primary electrodes to form a combined electrode assembly, so that the gap between said pair of primary electrodes is smaller near said at least one outlet for flow of electrolyte from said electrolysis system than the gap between said pair of primary electrodes near said at least one inlet for flow of electrolyte into the system.

15. The gas evolving bipolar electrolysis system of claim 14, wherein at least one of said pair of primary electrodes is coated with an electrocatalyst material to reduce electrode overpotential.

16. The gas evolving electrolysis system of claim 15, wherein the electrocatalyst coating on either said pair of primary electrodes or said pair of secondary electrodes or both is varied to achieve a nearly uniform current density on surface of said combined electrode assembly.

17. The gas evolving bipolar electrolysis system of claim 15, further comprising a membrane interposed between said combined electrode assembly.

18. The gas evolving bipolar electrolysis system of claim 16, wherein the said at least inlet for flow of electrolyte into the electrolysis system is configured to handle electrolyte in either liquid or molten form.

19. The gas evolving bipolar electrolysis system of claim 16, wherein the said at least inlet for flow of electrolyte into the electrolysis system is configured to handle electrolyte comprising a potassium hydroxide solution.

* * * * *